United States Patent
Roberts et al.

(10) Patent No.: US 11,283,658 B2
(45) Date of Patent: Mar. 22, 2022

(54) PHASE-BASED PRE-CARRIER DETECTION

(71) Applicant: Raytheon Company, Waltham, MA (US)

(72) Inventors: Megan J. Roberts, Boalsburg, PA (US); Michael R. Gabrovsek, Boalsburg, PA (US); Shawn Henderson, State College, PA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/601,968

(22) Filed: Oct. 15, 2019

(65) Prior Publication Data

US 2021/0111934 A1 Apr. 15, 2021

(51) Int. Cl.
*H04L 27/227* (2006.01)
(52) U.S. Cl.
CPC ................................. *H04L 27/2273* (2013.01)
(58) Field of Classification Search
CPC .................................................. H04L 27/2273
See application file for complete search history.

(56) References Cited

U.S. PATENT DOCUMENTS

| | | | | |
|---|---|---|---|---|
| 6,226,337 B1* | 5/2001 | Klank | .................... | H04L 5/0048 370/210 |
| 2002/0097821 A1* | 7/2002 | Hebron | ................ | H04B 1/1036 375/346 |
| 2002/0167996 A1* | 11/2002 | Gazsi | .................. | H04L 25/0228 375/224 |
| 2009/0154602 A1* | 6/2009 | Furman | ............... | H04L 27/2275 375/324 |
| 2012/0163499 A1* | 6/2012 | Kim | ...................... | H04L 27/362 375/298 |
| 2015/0085960 A1* | 3/2015 | Kamiya | .............. | H04L 27/3836 375/346 |

\* cited by examiner

*Primary Examiner* — Janice N Tieu
(74) *Attorney, Agent, or Firm* — Daly Crowley Mofford & Durkee, LLP

(57) ABSTRACT

Methods and apparatus for phased-based pre-carrier signal detection in a communication system are described. In embodiments, inphase and quadrature (IQ) data is generated from a received signal. A current phase delta value is determined from the IQ data and combined with existing phase delta value, such as an averaged phase delta value, which is compared with a threshold value to determine if a pre-carrier signal in the received signal has ended.

20 Claims, 6 Drawing Sheets

PHASE-BASED PRE-CARRIER DETECTION

STATEMENT REGARDING FEDERALLY SPONSORED RESEARCH

This invention was made with government support. The government has certain rights in the invention.

BACKGROUND

As is known in the art, communication systems may send a pre-carrier/tone prior to transmitting data. In some conventional systems, pre-carrier detection is performed by beginning demodulation at the start of pre-carrier and monitoring the demodulated signal for transitions. This method begins demodulation with the baud clock disabled and then as soon a transition, i.e., a new bit is different from old bit, is detected, the baud clock is enabled. In other conventional systems, frequency analysis is used to identify the pre-carrier prior to the start of demodulation and then not demodulating the pre-carrier.

When demodulating phase modulated signals, e.g., BPSK, QPSK, QAM, etc., a pre-carrier or tone can cause the demodulator to fail to lock to the baud, resulting in significant bit errors on the demodulated signal. Demodulators require transitions in order to detect symbol boundaries. Thus, when there are no transitions, it may be very difficult to detect the symbols.

Some conventional systems use phase transition counting to detect end of pre-carrier. Known transition counting techniques assume that the demodulator has a "good enough" baud lock in order to be able to produce bits with few bit errors; however the baud clock cannot sync with no transitions. If the baud clock is sampling in the wrong place, no valid bits will be produced. When this happens, the signal never leaves pre-carrier and demodulation simply fails. This is entirely dependent on starting phase, so even a clean, high SNR signal can fail to successfully demodulate. A low SNR signal or signal with an unstable carrier can also result in significant bit errors during the pre-carrier which can trigger pre-mature end-of-pre-carrier detection. The mitigation to bit errors is to require more transitions before enabling the baud clock, but this can result in enabling the baud clock too late and missing valuable parts of the signal. An improperly locked baud clock can cause the demodulator to lose the signal entirely and produce no bits of value. In addition, frequency analysis is limited in accuracy by the FFT size used and performs poorly if the carrier is unstable or significant interference is present. It also assumes that demodulation of the pre-carrier is not desired.

In view of the above discussion, it should be appreciated that improved methods and apparatus for pre-carrier end detection are desired, e.g., that facilitate detection of end of pre-carrier with high accuracy and aid in improving demodulation with reduced bit errors.

SUMMARY

Embodiments of the invention provide phase-based pre-carrier detection by comparing the phase of a new symbol to the phase of a previous symbol. In embodiments, during pre-carrier detection, the phase delta will be close to 0 and in random data the phase delta will be closer to $\pi/2$ (than to 0) for BPSK signals. By computing the phase delta between the symbols and then using a filter, such as a sliding sum filter for smoothing, the end of pre-carrier can be identified once the filtered phase deltas are greater than a threshold, such as $\pi/4$. In embodiments, end of pre-carrier detection has an accuracy of approximately one symbol and significantly fewer transitions are utilized than conventional transition-counting techniques.

In one aspect, an exemplary method comprises: generating inphase and quadrature (IQ) data from a received modulated signal; determining a phase delta value associated with the IQ data; and determining if a pre-carrier signal in the received signal has ended based on the phase delta value. In some embodiments, the received modulated signal is a phase modulated signal.

In some embodiments, the received modulated signal comprises one of phase shift keying (PSK) data, Binary Phase Shift Keying (BPSK) data, Quadrature Phase Shift Keying (QPSK) data, 8-Point Phase Shift Keying (8 PSK), 16-Point Phase Shift Keying (16 PSK), Quadrature amplitude modulation (QAM), or Offset Phase Shift Keying (OQPSK). In some embodiments, determining if a pre-carrier signal in the received signal has ended based on determined phase delta value includes: comparing the phase delta value with a threshold value; and determining one of: the pre-carrier signal has ended when the comparison indicates the phase delta value is greater than the threshold value, or the pre-carrier signal continues when the comparison indicates the phase delta value is less than the threshold value. In some aspects, the threshold value is selected based on a type of phase modulation of the received phase modulated signal. In some aspects, the modulated signal comprises BPSK data, and the threshold value comprises about PI/4. In some aspects, the modulated signal comprises QPSK data. In some aspects, the phase delta value comprises an average of phase deltas across adjacent symbols. In some aspects, the average comprises a sliding average. In some embodiments, the method further comprises determining that the pre-carrier signal has ended without use of a baud lock. In some embodiments, the method further comprises sampling a symbol of the received modulated signal a given number of times. In some embodiments, the sampling occurs at random times. In some embodiments, the method further comprises determining the phase delta comprises calculating a phase difference between adjacent symbols of the IQ data.

In another aspect, a system comprises: a processor and a memory configured to: to generate inphase and quadrature (IQ) data from a modulated signal; determine a phase delta value associated with the IQ data; and determine if a pre-carrier signal in the received signal has ended based on the phase delta value.

In some embodiments, the received phase modulated signal comprises one of phase shift keying (PSK) data, Binary Phase Shift Keying (BPSK) data, Quadrature Phase Shift Keying (QPSK) data, 8-Point Phase Shift Keying (8 PSK), 16-Point Phase Shift Keying (16 PSK), Quadrature amplitude modulation (QAM), or Offset Phase Shift Keying (OQPSK). In some embodiments, determining if a pre-carrier signal in the received signal has ended based on determined phase delta value includes: comparing the phase delta value with a threshold value; and determining one of: the pre-carrier signal has ended when the comparison indicates the phase delta value is greater than the threshold value, or the pre-carrier signal continues when the comparison indicates the phase delta value is less than the threshold value. In some embodiments, the threshold value is selected based on a type of phase modulation of the received phase modulated signal. In some embodiments, the phase modulated signal comprises BPSK data and the threshold value comprises about PI/4. In some embodiments, the phase delta value comprises an average of phase deltas across adjacent symbols. In some embodiments, the processor and memory are further configured to determine that the pre-carrier signal has ended without use of a baud lock, and/or the processor and memory are further configured to sample a symbol of the phase modulated data a given number of times.

BRIEF DESCRIPTION OF THE DRAWINGS

The foregoing features of this invention, as well as the invention itself, may be more fully understood from the following description of the drawings in which.

DETAILED DESCRIPTION

Figure 1:
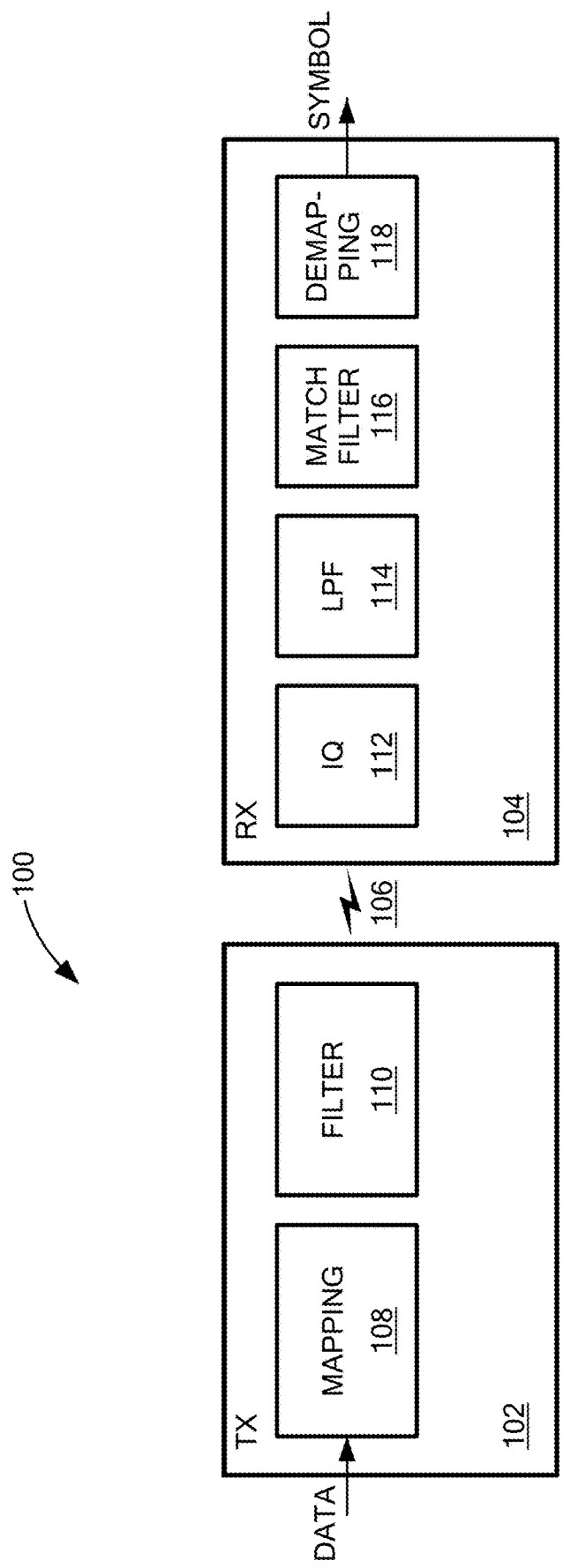
FIG. 1 is a high-level block diagram of a communication system having phase-based pre-carrier detection in accordance with example embodiments of the disclosure.

FIG. 1 shows an example phase shift keying (PSK) based communication system 100 having a transmitter 102 and a receiver 104 connected via one or more channels 106, such as air, for wireless transmission, for example. The transmitter 102 can include a mapping module 108 to map data. For example, in binary phase shift keying (BPSK) two different signals can be transmitted. Each nonreturn to zero (NRZ) data bit of value 0 is mapped into a −1, and each NRZ data bit of value 1 is mapped into a +1. The resulting signal is then passed through a filter 110 to limit its bandwidth and then multiplied by the carrier signal, e.g., cos ωt, for transmission across the channel 106.

The receiver 104 can include an IQ module 112 to generate inphase quadrature data from the received data. The I, Q data can be filtered, such as by a low pass filter 114, and match filtered 116 to recover the BPSK symbols by a demapping module 118. As described more fully below, the receiver 104 can include phase-based pre-carrier detection in accordance with example embodiments of the invention.

Figure 2:
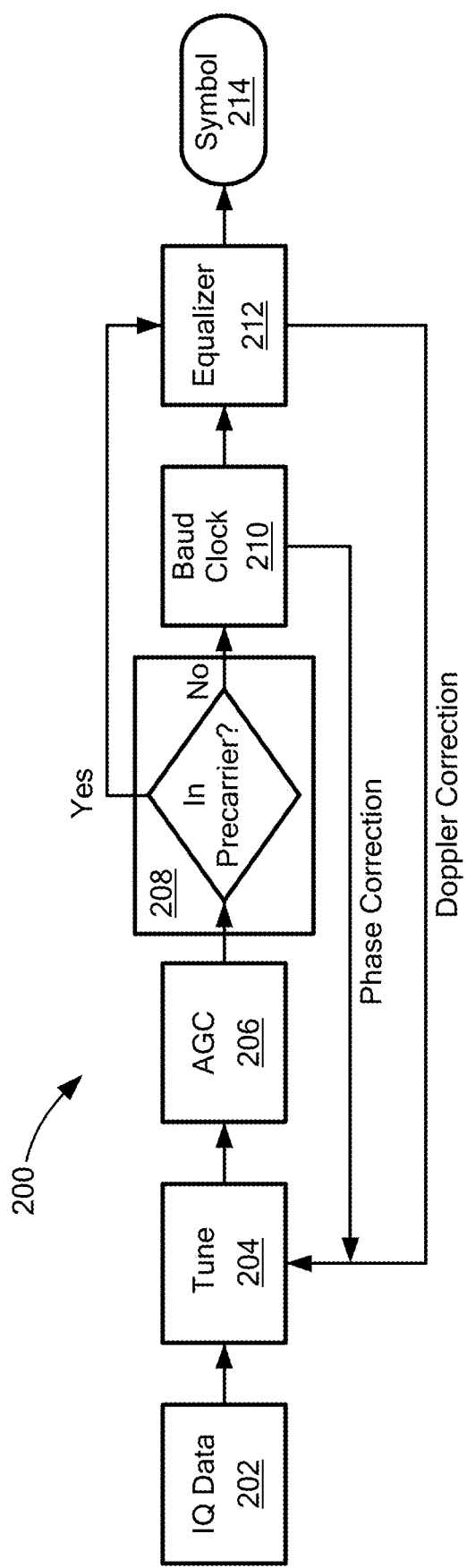
FIG. 2 is a representation of an example implementation of receive-side phase-based pre-carrier detection in accordance with example embodiments of the disclosure.

FIG. 2 shows an example phase-based pre-carrier detection system 200 in accordance with example embodiments of the invention. A received signal is processed to generate I and Q data 202, which is provided to a tuning module 204. The tuning module 204 utilizes feedback from the equalizer 212 and/or baud clock in order to track the carrier and phase of the incoming signal. For example, a Doppler correction may be provided by the equalizer 212 and phase correction may be provided by the Baud clock 210 in some embodiments. The tuned data is provided to an automatic gain control (AGC) module 206. A pre-carrier detection module 208 is configured to determine whether the signal from the AGC module 206 is a pre-carrier signal or not. If not, the signal is provided to a baud clock module 210 which squares the waveform using symbol transitions. The received signal is then provided to an equalizer module 212 for equalizing the signal and generating the symbol 214. If the AGC module 206 output is a pre-carrier signal, as detected by the pre-carrier detection module 208, the pre-carrier signal is provided to the equalizer module 212.

In embodiments, the system 200 can include Doppler correction in the equalizer 212 which provides tuning data to the tuning module 204. In addition, the baud clock 210 can provide phase correction to the tuning module 204. The baud clock generates a phase correction that will adjust the timing of the samples to correct the phase for optimal demodulation.

The equalizer 212 tracks the carrier signal and locks to the desired constellation. An unstable pre-carrier may cause the equalizer to rotate which may create false transitions or flip-flop. A typical pre-carrier bit stream would be all one symbol (e.g., 0's or 1's). When the pre-carrier is unstable, the equalizer will rotate between symbols. For a BPSK example, the correct bit stream would be either all 0's or all 1's, while the bit stream produced by the demodulation of an unstable pre-carrier will alternate between streams of 0's and streams of 1's as the equalizer attempts to lock. During the transitions from 0's to 1's, random bits may be produced before the equalizer settles on the new rotation. Conventional transition counting algorithms may trigger end of pre-carrier early. In contrast, phase tracking in accordance with example embodiments of the invention does not require correct symbol determination, but rather, only detects actual transitions.

Figure 2A:
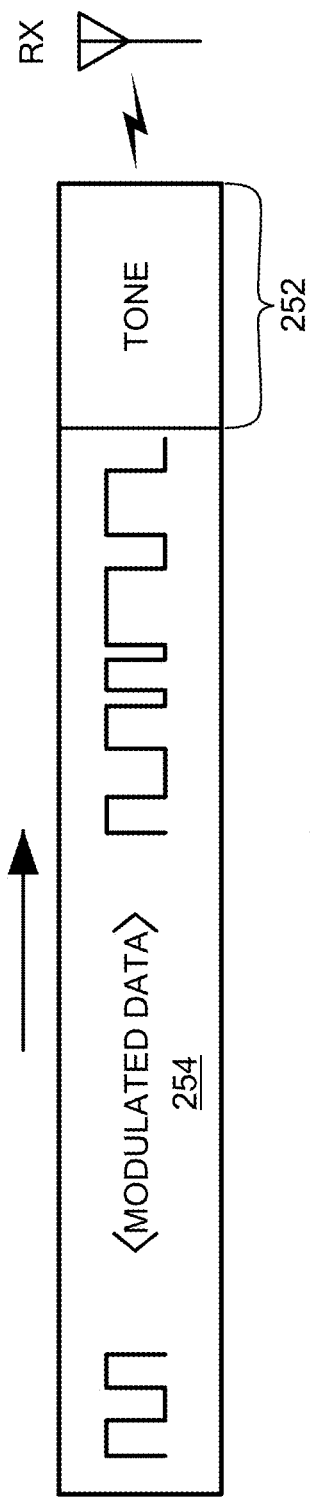
FIG. 2A is a waveform diagram showing a pre-carrier/tone followed by modulated data.

As shown in FIG. 2A, in general, pre-carrier or tone refers to a received signal portion prior to modulated data, and thus, contains substantially zero transitions. It should be noted that tones do not always occur at the beginning of the transmission. In the illustrated embodiment, an antenna 250 at the receiver first receives a pre-carrier/tone 252, which does not contain signal phase transitions, followed by modulated data 254, which does contain phase transitions (e.g., owing to the use of certain types of modulation schemes).

It is understood that a phase modulated system conveys data by changing some aspect of a carrier signal, which may be a sinusoidal signal, in response to a data signal. In PSK systems, the phase is changed to represent the data signal. The phase change can convey data by viewing the phase as conveying the information. In some conventional systems, the demodulator must have a reference signal against which to compare the phase of the received signal, or by viewing the change in the phase as conveying information, which can be considered a differential scheme.

Figure 3A:
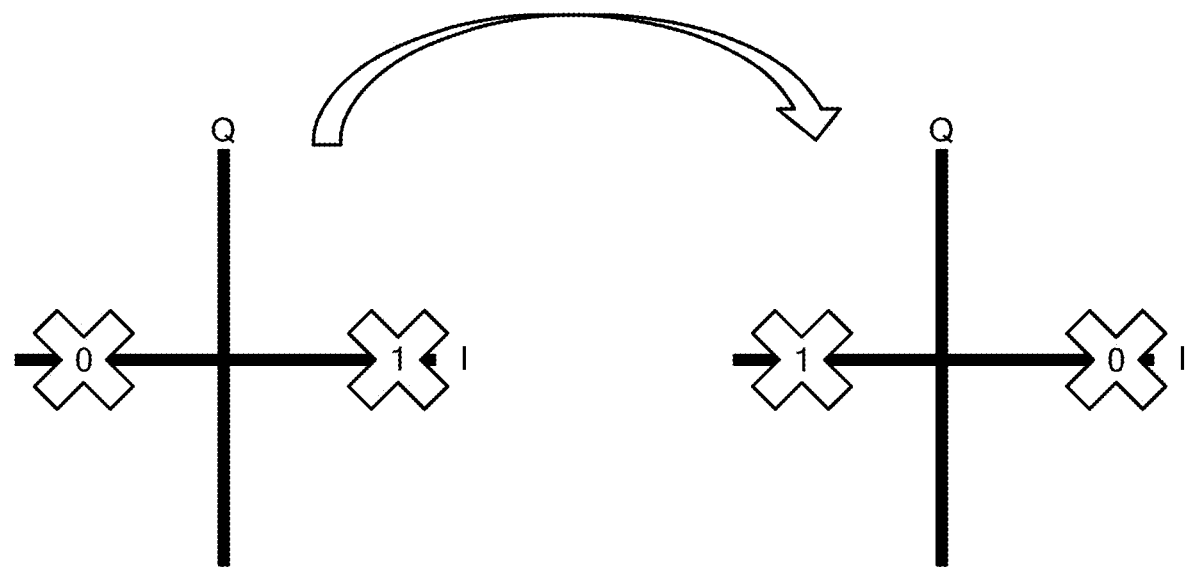
FIG. 3A is a constellation diagram of BPSK data points that can be used in example embodiments of a phase-based pre-carrier detection in accordance with example embodiments of the disclosure.
Figure 3B:
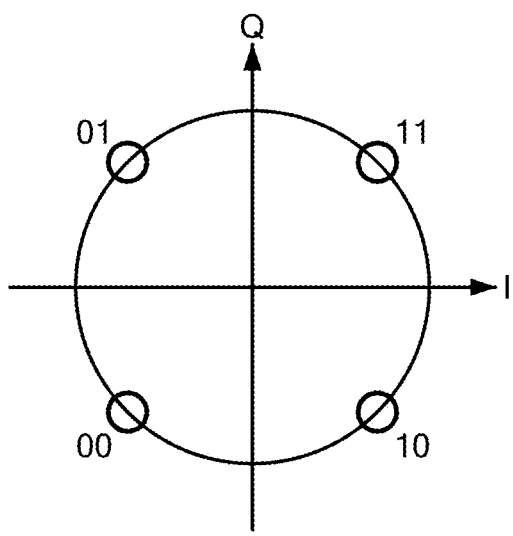
FIG. 3B is a constellation diagram of QPSK data points that can be used in example embodiments of a phase-based pre-carrier detection in accordance with example embodiments of the disclosure.

FIG. 3A shows an example constellation diagram for a phase change in a BPSK (binary phase-shift keying) system having I and Q axes. As can be seen, the phase changes 180 degrees from the left to the right. FIG. 3B shows a constellation diagram for a quadrature PSK (QPSK) system in which four constellation points are spaced at ninety degrees.

The constellation diagrams shows the points in the complex planes with I, Q axes where the amplitude of each point along the in-phase axis is used to modulate a cosine (or sine) wave and the amplitude along the quadrature axis to modulate a sine (or cosine) wave. By convention, in-phase modulates cosine and quadrature modulates sine.

While example embodiments may be described in conjunction with BPSK and QPSK modulation, it is understood that any suitable modulation scheme (e.g., QAM and/or phase based) can be used to meet the needs of a particular application. It will be appreciated the positioning of the constellation points does not particularly matter and that BPSK may handle the highest noise level or distortion.

Figure 4:
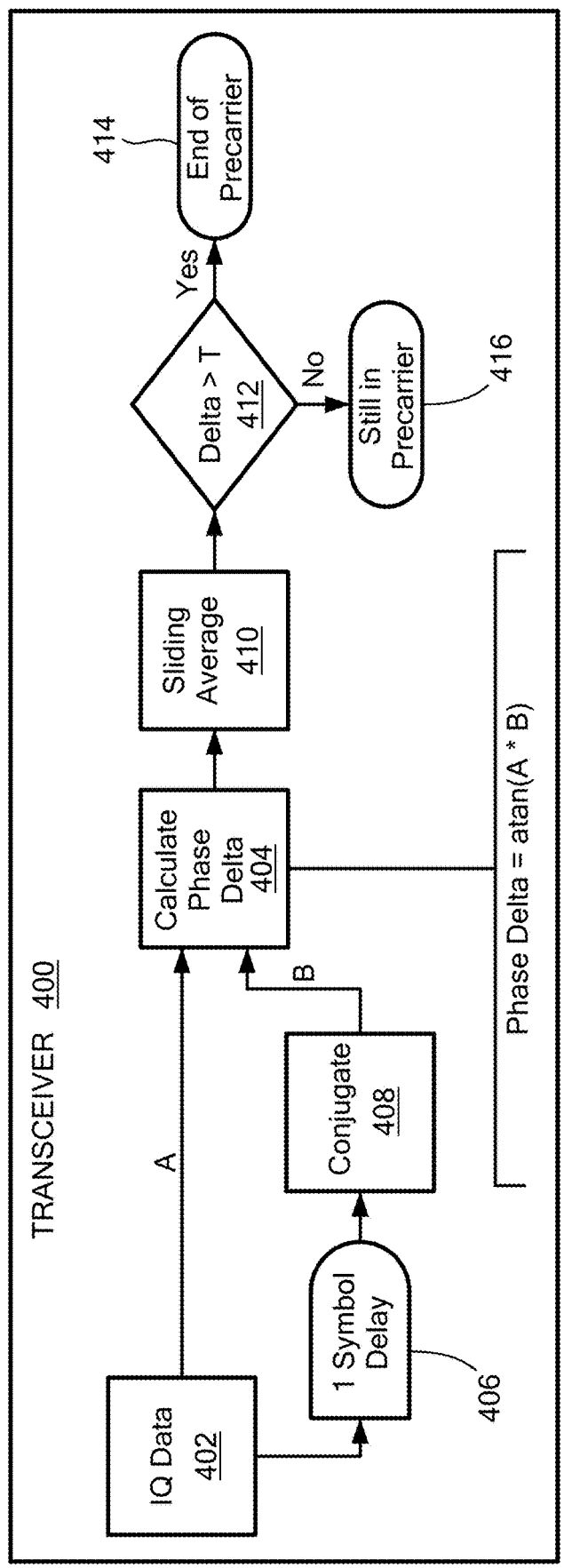
FIG. 4 is a representation of an example implementation of receive-side phase-based pre-carrier detection having phase delta analysis in accordance with example embodiments of the disclosure.

FIG. 4 shows an example processing implementation of phase-based pre-carrier detection in a transceiver 400 in accordance with illustrative embodiments of the invention. Received data modulates sine and cosine signals to generate I and Q data 402. In embodiments, the incoming data is not aligned in baud or phase. First data symbol A is (output as I and Q data) provided to a phase delta module 404. Another data symbol from the I and Q data 402 is delayed 406, such as by one symbol, and conjugated 408, e.g., flip the sign on the imaginary component, prior to being input to the phase delta module 404 as symbol B. That is, a conjugate-delay-multiply operation is performed in some embodiments. The phase delta module 404 determines a phase delta of the A and B symbols. In an example embodiment, the phase delta is computed using arctangent of the symbols A and B, e.g., a tan(A*B). It is understood that any suitable technique for determining phase delta can be used.

In some embodiments, the phase delta 404 output can be smoothed 410, such as by taking a sliding average, to reduce noise effects. The phase delta data, which may be averaged, is compared by a comparison module 412 to a given threshold T to determine whether the pre-carrier signal has ended. For example, in the illustrated embodiment, if the phase delta value is above the threshold T, the end of the pre-carrier is detected 414. If the phase delta value does not exceed the threshold T, then it may be assumed that the pre-carrier signal is still being received.

It will be appreciated that the value for the phase delta threshold T corresponds to the type of modulation scheme being used. During pre-carrier, the phase delta will be close to 0 and in random data the phase delta will be closer to PI/2 (than 0) for BPSK signals. The threshold T can be selected to accurate detect the end of pre-carrier. In an example embodiment, the threshold T is set to about PI/4 for BPSK signals. Modulated symbols with transitions have a phase delta of PI/Mary.

By computing the phase delta between the symbols, and then optionally using a filter, such as a sliding sum filter for smoothing, the end of pre-carrier can be determined by comparing the phase deltas with the selected threshold T, such as PI/4 for BPSK signals. In embodiments, the accuracy of end-of-pre-carrier detection is approximately 1 symbol. In addition, significantly fewer transitions are required to detect end of pre-carrier using phase delta thresholding than conventional transition counting techniques.

It is understood that unlike conventional transition counting, phase-based tracking embodiments do not actually require a baud lock. One can sample randomly within the symbol and get accurate results. Also, phase-based pre-carrier detection techniques described herein do not require an accurate or stable carrier as these techniques simply look for phase deltas between adjacent symbols. Noise and carrier issues that would normally cause a conventional demodulator to produce significant bit-errors do not affect phase delta processing embodiments described herein.

Figures 5A, 5B:
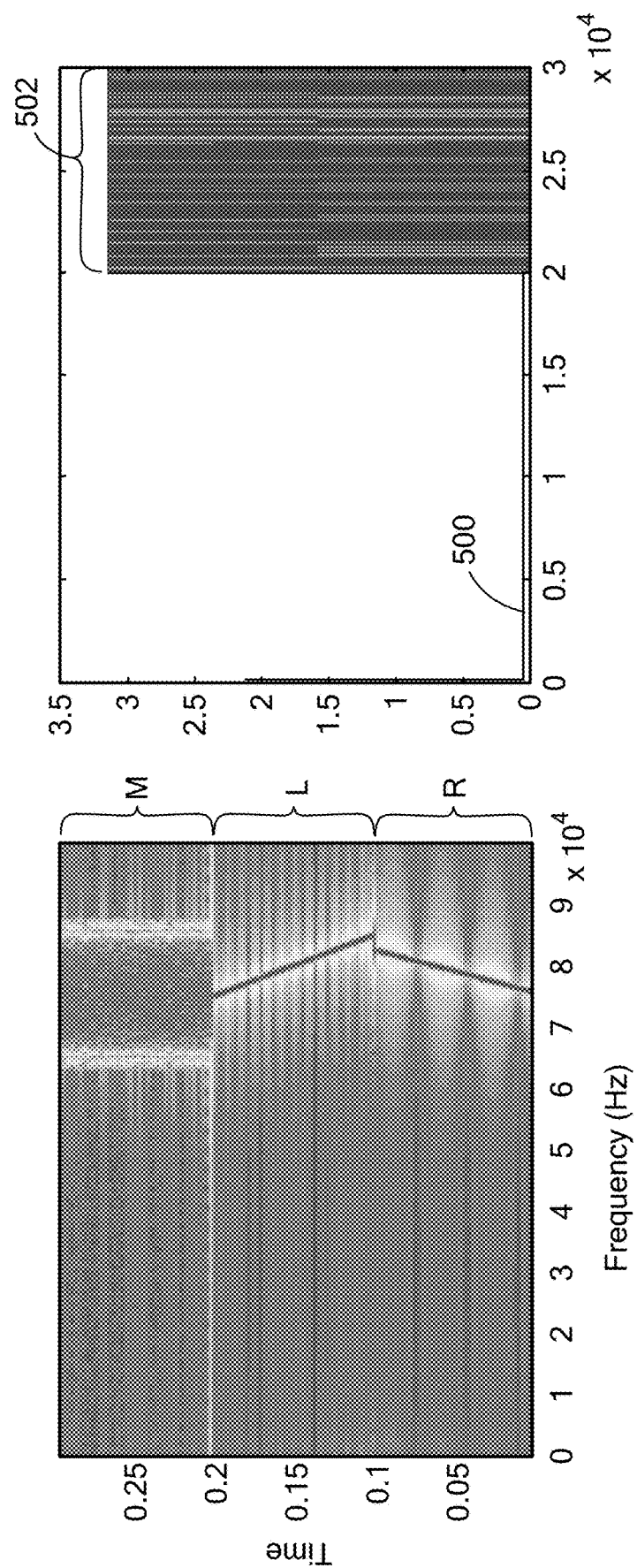
FIG. 5A is a waveform diagram showing a degraded carrier waveform.
FIG. 5B is a waveform diagram showing a phase plot of a tuned signal.

FIG. 5A shows an example incoming signal as a 'bad' pre-carrier signal. In this example, the pre-carrier can be seen initially to be tracking sharply to the right R, then making a carrier jump and tracking back to the left L before entering modulated data M. In this example, the modulated data has a stable carrier. A 'good' pre-carrier signal would plot as a straight line. In the real world, unstable pre-carriers can present as any kind of squiggly line.

FIG. 5B shows a phase plot of a tuned signal. The line 500 close to 0 indicates zero transitions (pre-carrier) while the random values between 0 and pi show modulated data 502.

Figure 6:
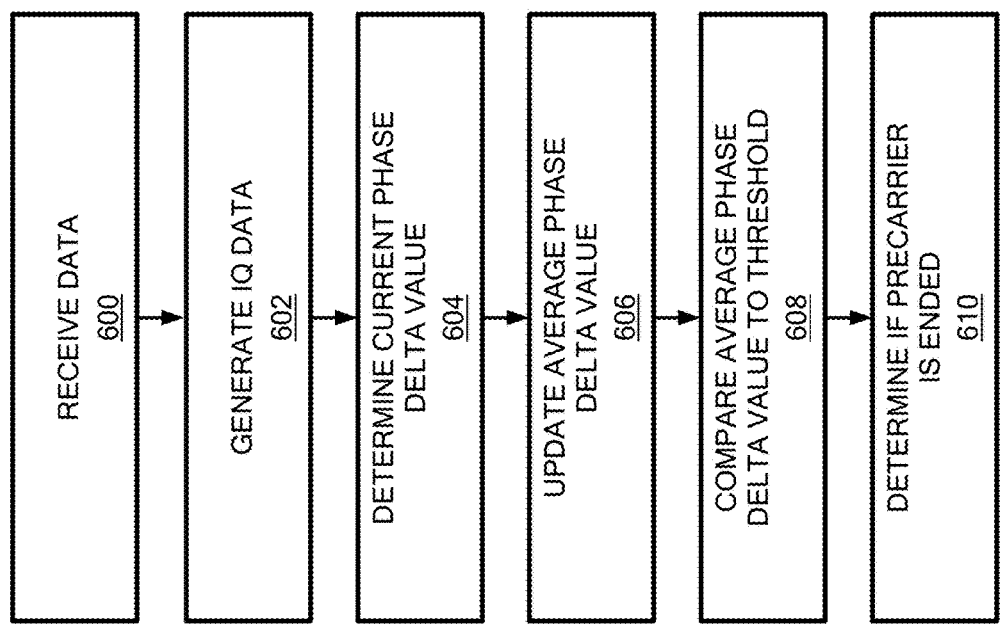
FIG. 6 is a flow diagram showing an example sequence of steps for implementing phase-based pre-carrier detection having phase delta analysis in accordance with example embodiments of the disclosure.

FIG. 6 shows an example set of steps for providing phase-based pre-carrier detection in accordance with an example embodiment. In step 600, incoming data is received. In step 602, the incoming data is combined with sine and cosine signal to generate inphase and quadrature (IQ) data. In step 604, a phase delta value is determined from the current data and delayed data. In some embodiments, the delayed data is delayed by one symbol.

In step 606, the present phase delta value is combined with existing phase delta values, such as to generate a new sliding average value. In step 608, the averaged phase delta value is compared to a threshold value to determine whether the pre-carrier signal is ended in step 610.

It is understood that embodiments of the invention are useful in a wide range of phase-based communication systems in which accurate pre-carrier detection is desirable. Embodiments of phase-based pre-carrier detections are well suited for applications in which pre-carrier signals are prone to corruption, such as high Doppler environments where transmitter and/or receivers may be moving, transmitter hardware may be unstable, high interference environments, and the like. Illustrative applications include airborne communication systems for aircraft, radar, unmanned aerial vehicles (UAVs), autonomous vehicles, space-based systems, etc.

Figure 7:
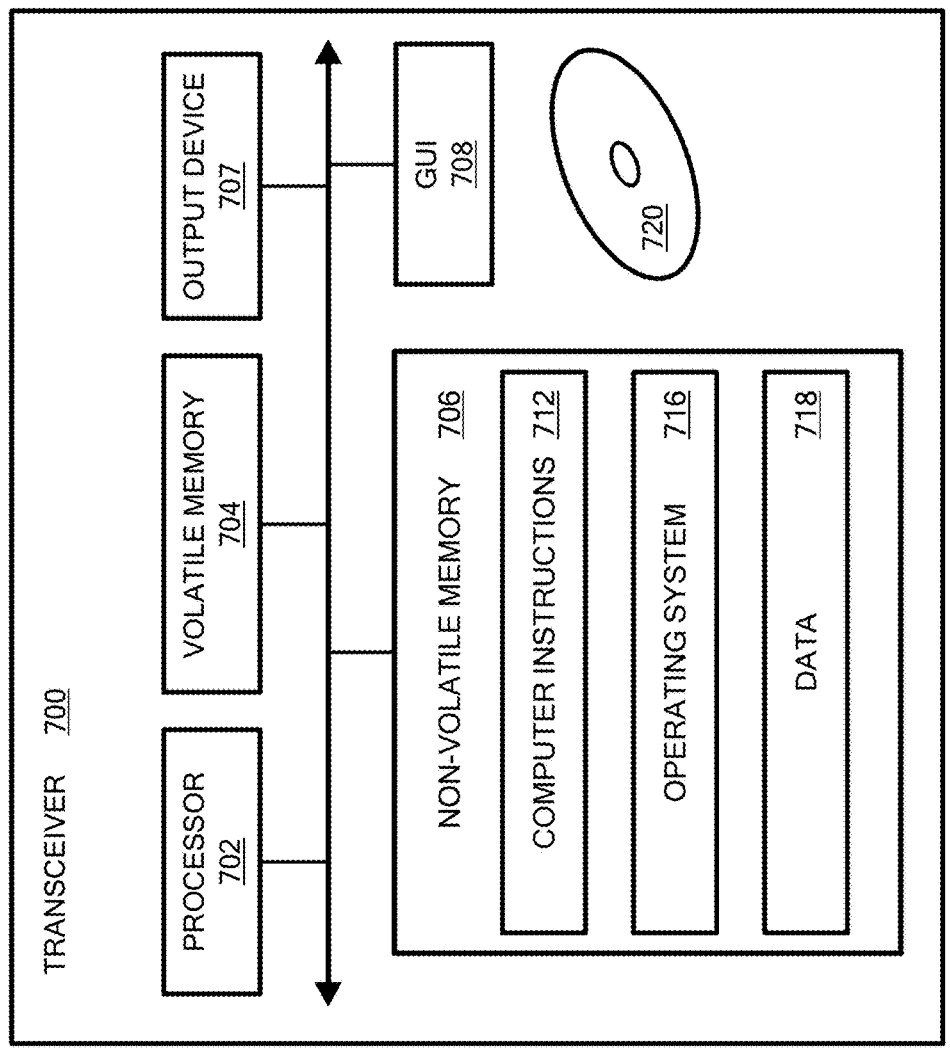
FIG. 7 is a schematic representation of an example computer that can perform at least a portion of the processing described herein.

FIG. 7 shows an exemplary computer 700 that can form part of a transceiver, such as the example transceiver 400 of FIG. 4, and perform at least part of the pre-carrier detection processing described herein, such as the processing of FIGS. 2, 4, and 6. The computer 700 includes a processor 702, a volatile memory 704, a non-volatile memory 706 (e.g., hard disk), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
   generating inphase and quadrature (IQ) data from a received modulated signal;
   determining a phase delta value associated with the IQ data; and
   determining if a pre-carrier signal in the received signal has ended based on the phase delta value, wherein the pre-carrier signal contains substantially zero transitions.

2. The method of claim 1, wherein the received modulated signal comprises one of phase shift keying (PSK) data, Binary Phase Shift Keying (BPSK) data, Quadrature Phase Shift Keying (QPSK) data, 8-Point Phase Shift Keying (8 PSK), 16-Point Phase Shift Keying (16 PSK), Quadrature amplitude modulation (QAM), or Offset Phase Shift Keying (OQPSK).

3. The method of claim 1, wherein determining if a pre-carrier signal in the received signal has ended based on determined phase delta value includes:
   comparing the phase delta value with a threshold value; and
   determining one of: the pre-carrier signal has ended when the comparison indicates the phase delta value is greater than the threshold value, or the pre-carrier signal continues when the comparison indicates the phase delta value is less than the threshold value.

4. The method according to claim 1, wherein the modulated signal comprises BPSK data.

5. The method according to claim 4, wherein the threshold value comprises about PI/4.

6. The method according to claim 1, wherein the modulated signal comprises QPSK data.

7. The method according to claim 1, wherein the phase delta value comprises an average of phase deltas across adjacent symbols.

8. The method according to claim 7, wherein the average comprises a sliding average.

9. The method according to claim 1, further including determining that the pre-carrier signal has ended without use of a baud lock.

10. The method according to claim 1, further including sampling a symbol of the modulated signal a given number of times.

11. The method according to claim 1, wherein determining the phase delta comprises calculating a phase difference between adjacent symbols of the IQ data.

12. A method, comprising:
    generating inphase and quadrature (IQ) data from a received modulated signal;
    determining a phase delta value associated with the IQ data; and
    determining if a pre-carrier signal in the received signal has ended based on the phase delta value,
    wherein determining if a pre-carrier signal in the received signal has ended based on determined phase delta value includes:
    comparing the phase delta value with a threshold value; and
    determining one of: the pre-carrier signal has ended when the comparison indicates the phase delta value is greater than the threshold value, or the pre-carrier signal continues when the comparison indicates the phase delta value is less than the threshold value,
    wherein the threshold value is selected based on a type of modulation of the received modulated signal.

13. A system, comprising:
    a processor and a memory configured to:
    to generate inphase and quadrature (IQ) data from a received modulated signal;
    determine a phase delta value associated with the IQ data; and
    determine if a pre-carrier signal in the received signal has ended based on the phase delta value, wherein the pre-carrier signal contains substantially zero transitions.

14. The system of claim 13, wherein the received phase modulated signal comprises one of phase shift keying (PSK) data, Binary Phase Shift Keying (BPSK) data, Quadrature Phase Shift Keying (QPSK) data, 8-Point Phase Shift Keying (8 PSK), 16-Point Phase Shift Keying (16 PSK), Quadrature amplitude modulation (QAM), or Offset Phase Shift Keying (OQPSK).

15. The system of claim 13, wherein determining if a pre-carrier signal in the signal has ended based on determined phase delta value includes:
    comparing the phase delta value with a threshold value; and
    determining one of: the pre-carrier signal has ended when the comparison indicates the phase delta value is greater than the threshold value, or the pre-carrier signal continues when the comparison indicates the phase delta value is less than the threshold value.

16. The system according to claim 15, wherein the phase modulated signal comprises BPSK data and the threshold value comprises about PI/4.

17. The system according to claim 13, wherein the phase delta value comprises an average of phase deltas across adjacent symbols.

18. The system according to claim 13, wherein the processor and memory are further configured to determine that the pre-carrier signal has ended without use of a baud lock.

19. A system, comprising:
a processor and a memory configured to:
to generate inphase and quadrature (IQ) data from a received modulated signal;
determine a phase delta value associated with the IQ data; and
determine if a pre-carrier signal in the received signal has ended based on the phase delta value, wherein the pre-carrier signal contains substantially zero transitions,
wherein determining if a pre-carrier signal in the signal has ended based on determined phase delta value includes:
comparing the phase delta value with a threshold value; and
determining one of: the pre-carrier signal has ended when the comparison indicates the phase delta value is greater than the threshold value, or the pre-carrier signal continues when the comparison indicates the phase delta value is less than the threshold value,
wherein the threshold value is selected based on a type of phase modulation of the received phase modulated signal.

20. A non-transitory computer readable medium comprising instructions which when executed by at least one processor causes the at least one processor to:
generate inphase and quadrature (IQ) data from a received modulated signal;
determine a phase delta value associated with the IQ data; and
determine if a pre-carrier signal in the modulated signal has ended based on the phase delta value, wherein the pre-carrier signal contains substantially zero transitions.

* * * * *